United States Patent Office 3,462,263
Patented Aug. 19, 1969

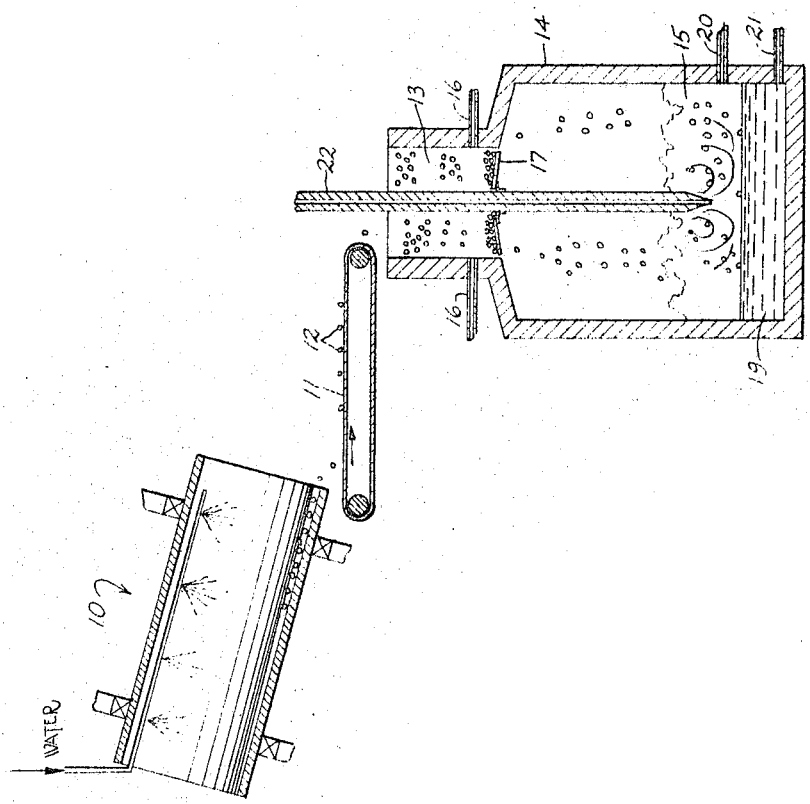

3,462,263
REDUCTION OF IRON ORE
John H. Walsh, P.O. Box 233, Manotick, Ontario, Canada; and Hugh P. Hudson, 518 Piccadilly Ave.; John C. Botham, 840 Denison Crescent; and Joseph E. Landon, 1150 Meadowlands Drive, all of Ottawa, Ontario, Canada
Filed June 23, 1966, Ser. No. 559,865
Claims priority, application Canada, Aug. 11, 1965, 937,914, Patent 791,059
Int. Cl. C21b *11/00*
U.S. Cl. 75—40         9 Claims

ABSTRACT OF THE DISCLOSURE

The invention relates to a process for the reduction of iron ore wherein pellets of finely divided coal and iron ore are initially subjected to a step which semi-cokes the coal in the pellets which are then immersed in a foaming body of slag to cause reduction of iron oxide in the pellets with formation of iron droplets thereon and evolution of carbon monoxide. Oxygen under pressure is injected into the slag body to cause combustion of the CO to $CO_2$ and to supply, as a result of said combustion, the thermal energy needed for reduction of the iron oxide.

---

This invention relates to a process for the reduction of iron ore and concentrates thereof.

In the production of iron, the blast furnace method of reduction is that conventionally and universally employed. While other methods have been proposed, they have no clear advantage over the blast furnace procedure in other than special circumstances.

To meet the high performance standards of the blast furnace, developers of alternative methods of iron reduction are turning increasingly to processes that use fuel and ores or concentrates in their available fine state and which carry out the reduction under conditions such that the reduction of iron oxide proceeds rapidly. The so-called "direct reduction" principle has been frequently employed and has received particular attention. The "direct reduction" reaction is formally stated as occurring according to the following equation:

$$\text{Iron Oxide} + C \rightarrow Fe + CO \qquad (1)$$

It is well known that when the system temperature is such that the iron oxide, carbon and the metallic iron produced are all in the solid state, the reaction proceeds according to the coupled equations:

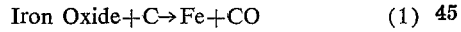

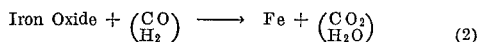
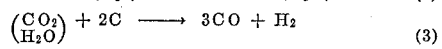

The thermal change in Equation 2 with carbon monoxide as reductant is somewhat exothermic depending upon the oxide of iron concerned and the temperature but is somewhat endothermic when hydrogen gas is used. Reduction 3, on the other hand, is always strongly endothermic. Thus, while Equation 1 accurately describes this reaction for thermo-chemical calculation purposes, it obscures the fact that the reduction is probably largely performed by hydrogen on account of its rapid diffusivity inside iron oxide particles and that the thermal energy is required largely by the solid carbon and not the solid iron oxide.

For the case when the iron oxide is liquid (the melting range of iron oxides particularly in the presence of typical gangue minerals such as $SiO_2$, CaO, MgO, etc., is separated from that of carbon-saturated metallic iron, at the point of maximum separation, by only 230° C. with the oxide having the higher melting point, and, in the case of a practical concentrate, the melting ranges are probably not separated by more than 100° C.), the product iron is also nearly always liquid and Equation 1 interprets the reaction correctly. Little difference is to be expected between the temperatures of the oxide and the carbon when the oxide is liquid. This type of reaction between liquid oxide and carbon is generally held to occur rapidly since the metallic iron product is liquid itself and since metallic iron has a greatly different surface tension than the oxide with respect to both the carbon and the gas phase, the liquid metal constantly displaces itself to allow fresh contact between the liquid oxide and the carbon. However, this liquid-state reduction has the disadvantage that, as the reduction proceeds, the gangue minerals become concentrated in the remaining fraction of the liquid oxide phase, thus reducing the chemical activity of the iron oxide. The reaction rate should decline when reduction approaches completeness; a high grade ore or concentrate will have an advantage over less pure sources of iron oxide in this respect.

The objective of most modern iron producing processes under development based on the "direct reduction" reaction as formally stated in Equation 1, is to burn the carbon monoxide product with either oxygen or preheated air to provide ideally the entire thermal requirements of the process. In other processes of this type the CO leaving the bath is burnt directly above it whereby the heat generated from this combustion is directed back to the bath.

The chief problem involved in the development of an industrial process to use the principle of direct reduction is to provide means for transferring the thermal energy from the region where the hot CO produced is oxidized with oxygen or air to the region where it is required, namely; in the bath where the colder than reaction vessel temperature reactants are fed to the reactor and where the endothermic reaction according to Equation 1 takes place. The objective is to achieve good thermal transfer and poor chemical transfer between the strongly oxidizing and strongly reducing zones within the same or between closely associated reaction vessels and to introduce the iron oxide under conditions where the reaction will take place rapidly.

It is a general object of this invention to provide a more economical process for reducing iron ore wherein both capital and operational costs are substantially reduced.

A more specific object is to provide a direct reduction process for the treatment of iron wherein the feed is subject to convenient and economical preparation, wherein the reaction takes place in a very rapid manner, and wherein the iron may be recovered in a satisfactory and effective way.

The invention will be described with reference to the accompanying drawing, in which:

The figure is a diagrammatic illustration of an apparatus and flow sheet for carrying out the process thereof.

The iron ores or concentrates employed in accordance with the invention are of a fineness such as are readily commercially available. Preferably, the particle size is minus 100 mesh (Tyler Standard) or less.

The fine ore is admixed with a carbon-containing substance such as high-volatile coking coal. If coal is employed, it is of a degree of fineness substantially equivalent to that of the ore. The mixture is briquetted, extruded or pelletized with or without a binder such as bentonite, asphalt, waste sulphite liquor or derivatives thereof. It will be appreciated that, in some instances, the characteristics and fineness of the coal and ore may make it possible to produce coherent shapes without a binder. In other instances, use of about 2% by weight of a binder is desirable. In still other instances, the binder itself, such as asphalt, may constitute the source of carbon.

The proportion of carbon containing substance employed in the mixture should be sufficient to allow the fixed carbon therein to remove all the oxygen of the iron oxide. The ore content of the mixture may be up to 80% by weight thereof. However, the proportions will vary depending upon the iron and carbon content of the ore and carbon-containing substance. For instance, for a magnetite concentrate containing 65% iron and a coking coal containing 65% fixed carbon, the blend will be about 25% coking coal and 75% iron ore by weight.

The size of the pellets or shapes is such that they will substantially maintain their form during the process. Up to a three inch maximum dimension has been found satisfactory. A preferred size range is ¼ inch to 2 inches.

The agglomeration step is performed in any suitable manner as by means of the pelletizing drum 10.

A conveyor 11 conveys the formed entities 12 from the drum to a semi-coking chamber 13 in the top portion of an upright high temperature reactor 14. The entities are semi-coked in this chamber using the surplus sensible energy available in the leaving hot oxidized gases from the reactor. While preheating and pre-reduction do occur in this preliminary step, the main object is to produce an entity sufficiently strong and shock resistant to permit immersion without breaking of the hot iron-coke pieces in a body of liquid slag 15 in the reactor, such slag being of the blast type and containing lime, silica, alumina, and other impurities, and fluxes and foaming agents as required. The temperature range in the chamber 13 is 500–800° C. Air injection inlets 16 may be provided for supply of air to the chamber 13 when necessary.

The semi-coked entities are now immersed in the foaming slag such that they are fully covered by the hot slag. As shown in the drawing, the entities may be dropped into the slag through discharge device 17.

The specific gravity of the iron-coke pieces is about 2.5 depending upon the swelling characteristics of the coal-iron oxide blend on semi-coking. Since the specific gravity of the slag is about the same (about 2.8) depending on the slag temperature and composition, the iron-coke pieces will remain suspended in the foaming slag.

At first a layer of frozen slag may adhere to the exterior surfaces of the entities which will protect the fixed carbon from oxidizing gases until the temperature of the entities reaches the range where reduction is very rapid. Reduction occurs when the iron oxide is in the solid state but proceeds at a rapid rate as its melting range is passed. When this temperature range is reached, and this occurs within a very short time usually of the order of two to three minutes, there is substantial evolution of gas through the pores of the entity protecting from oxidation both the remaining fixed carbon and the iron droplets held in the pores of the coke.

When the reduction is substantially complete, little fixed carbon is left and the cell walls of the coke collapse, whereupon the tiny droplets of carbon-containing iron coalesce and then break free from the small quantity of excess residual coke. The coalesced iron droplet, now has a specific gravity of about 6.5 and thus falls rapidly through the slag to the iron layer 19 which collects below the slag body.

The reactor 14 is provided with a slag tap 20 and an iron tap 21.

The carbon content of the produced iron (about 3.5%) is sufficiently high to protect it from oxidation on passage through the slag and as a consolidated metal bath below the slag.

A most important feature of the invention resides in the supply of thermal energy to the slag to meet the requirements of the reduction reaction. The gas produced in the iron-coke entity—mostly CO and some $H_2$—are released from the entities inside the slag at the temperature of the slag. Due to the relatively high viscosity of this type of slag, these combustible gases form coarse bubbles in the slag.

An adjustable oxygen supply lance 22 is mounted in the reactor and, as shown, extends in a vertical direction into the slag body. By means of the lance, a high velocity stream of oxygen, which may be pre-heated, is injected into the slag to produce entrainment of oxygen inside the slag and rapid agitation thereof. It is an important feature of the invention that this step ensures that the bulk of the combustible gases released from the iron-coke react with the oxygen to form $CO_2$ and $H_2O$ vapour to the greatest extent possible inside the slag body. In this manner, the relatively chemically inactive slag is the heat exchange medium to transfer the needed energy, mainly by convection, to the surfaces of the iron-coke pieces.

Not all the combustibles will be burnt inside the slag; an unburnt fraction will be burnt with oxygen above the slag at a high flame temperature and a portion of the energy will be radiated downwardly towards the slag. The stirring action of the injected oxygen is important to help absorb this latter radiant energy and also to assist in the transfer of energy to the quiet layer of underlying iron which is losing energy by normal heat loss through the refractory walls of the reactor.

It should be emphasized that it is of critical importance that the iron ore-coke entities employed be capable of withstanding shock. However, formation of these entities presents no problems. For instance, it has been found that, if a coking coal of highly fluid type when heated is chosen, and the coal crushed to −100 mesh size, strong semi-coke will result, even if no agglomeration step is used, with blends as high as 82% by weight iron oxide. Furthermore, it has been found that when a typically finely ground ore concentrate is used, incipient iron reduction is readily initated, and that these semi-coked or high temperature coked pieces prepared from ore-coal blends with as high as 82% iron ore are capable of withstanding plunging into high temperature slag (1300–1400° C.) from room temperature without breaking or appreciable thermal shock cracking. Pieces of iron ore-coke made from 82% iron ore concentrate-coal blends in patties as large as 2½ inches in diameter by 1½ inches high have been plunged into hot slag with no evidence of cracking. Low temperature coke pellets produced from iron ore-coal blends ½ inch in diameter have also shown high resistance to thermal shock in both small and large scale experiments.

The iron and the slag can be tapped either continuously or intermittently. Since the chemical potential of oxygen in the slag is high, as a result of the oygen lance blowing oxygen into it, when it is desired to reduce the sulphur content of the iron to a low level, a deoxidant, such as aluminum powder, can be added to the slag as it leaves the reactor and the slag then admixed with the iron. This can be done conveniently by directing the slag stream into a ladle, with addition of aluminum to the stream from time to time. This iron is then poured into the same ladle, mixing with and then displacing the slag. Other well known desulphurization methods can also be employed.

Reduction may be permitted to occur in the preliminary semi-coking stage when a very reactive iron ore or concentrate is available. In fact, it is possible that some oxygen will be removed by the action of the volatile matter of the coal without the consumption of fixed carbon if the temperature of the semi-coking step is kept below 950° C. This results in a saving of both coal and oxygen for the production of iron. When this pre-reduction occurs, if the thermal requirements cannot be met by the counter-current passage of the hot oxidized gases from the high temeprature step because of their necessarily diminished quantity, more energy can be obtained by injecting air in the semi-coking stage to partly oxidize the volatile matter of the coal.

We claim:

1. A process for the reduction of iron ore which comprises mixing said ore in finely divided form with finely divided coal having fixed carbon in the stoichiometric proportion necessary to remove all the oxygen in the iron oxide in said ore, forming from said mixture a multiplicity of coherent entities each having a maximum dimension of 2½ inches, semi-coking the coal in said entities, then immersing said entities in a foaming body of slag of the low-ron blast furnace type having a temperature of about 1300–1400° C. to cause reduction of iron oxide in said entities with formation of iron droplets thereon and evolution of carbon monoxide gas therefrom, said gas being in the form of bubbles in said body of slag, injecting oxygen under pressure into said slag body to cause combustion of said gas to carbon dioxide within said slag body and to supply as a result of said combustion the tehrmal energy required for said reduction step, continuing said reduction step until the cell walls of said entities collapse as a result of consumption of said fixed carbon and said iron droplets fall through said slag body and collect as an iron bath at the base thereof, and tapping said iron from said bath.

2. A process for the reduction of iron ore as defined in claim 1, wherein said semi-coking step is conducted by employing the waste gases of said reduction step.

3. A process for the reduction of iron ore as defined in claim 1, wherein the specific gravity of said entities is about 2.5, and the specific gravity of said foaming slag is about 2.8.

4. A process for the reduction of iron ore as defined in claim 1, wherein each said entity has a maximum dimension of ¼ inch to 2 inches.

5. A process for the reduction of iron ore as defined in claim 1, wherein said coal is of the coking type and said iron ore has a particle size of —100 mesh, said semi-coked entities containing up to about 80% iron ore by weight.

6. A process for the reduction of iron ore as defined in claim 1, wherein said entities contain up to about 2% by weight of a binder.

7. A process for the reduction of iron ore as defined in claim 1, said entities being sufficiently dense to sink in said slag, said slag having a specific gravity of at least 2.8.

8. A process for the reduction of iron ore as defined in claim 1, wherein said oxygen is injected under high velocity to cause turbulence and foaming of said slag thereby to enhance the convective heat transfer characteristics of said slag.

9. A process for the reduction of iron ore which comprises mixing said ore in finely divided form with coal in finely divided form, said coal having fixed carbon in the stoichiometric proportion necessary to remove all the oxygen in the iron oxide in said ore, forming from said mixture a multiplicity of coherent entities each of one-quarter inch to two inches in size, semi-coking said entities, immersing the semi-coked entities in a foaming body of slag of the low-iron blast furnace type having a temperature of about 1300–1400° C. to cause reduction of iron oxide in said entities with formation of iron droplets thereon and evolution of gas comprising carbon monoxide and hydrogen therefrom, said gas being in the form of bubbles in said body of slag, injecting oxygen under pressure into said slag body to cause combustion of the major portion of said gas to carbon dioxide and water vapour within said slag body and to supply, as a result of said combustion, the thermal energy required for said reduction step, continuing said reduction step until the cell walls of said entities collapse as a result of consumption of said fixed carbon and said iron droplets containing in excess of 3% carbon fall through said slag body and collect as an iron bath at the base of said slag body, and tapping said iron from said bath.

References Cited

UNITED STATES PATENTS

| 2,557,650 | 6/1951 | Gilliland | 75—40 |
| 2,602,735 | 7/1952 | Howard | 75—40 |
| 2,612,444 | 9/1952 | Rummel | 75—40 |
| 3,038,795 | 6/1962 | Rummel | 75—40 |
| 3,169,055 | 2/1965 | Josefsson et al. | 75—40 |
| 3,326,671 | 6/1967 | Worner | 75—40 |
| 3,340,044 | 9/1967 | MacAfee et al. | 75—40 |

FOREIGN PATENTS

| 474,408 | 11/1937 | Great Britain. |

L. DEWAYNE RUTLEDGE, Primary Examiner

HENRY W. TARRING II, Assistant Examiner

U.S. Cl. X.R.

75—51

UNITED STATES PATENT OFFICE
CERTIFICATE OF CORRECTION

Patent No. 3,462,263                           August 19, 1969

John H. Walsh et al.

It is certified that error appears in the above identified patent and that said Letters Patent are hereby corrected as shown below:

In the heading to the printed specification, lines 3 to 7, "P.O. Box 233, Manotick, Ontario, Canada; and Hugh P. Hudson, 518 Piccadilly Ave.; John C. Botham, 840 Denison Crescent; and Joseph E. Landon, 1150 Meadowlands Drive, all of Ottawa, Ontario, Canada" should read -- Manotick, Ontario, Canada, and Hugh P. Hudson, John C. Botham, and Joseph E. Landon, all of Ottawa, Ontario, Canada, assignors to Canadian Patents and Development Limited, Ottawa, Ontario, Canada, a corporation of Canada --.

Signed and sealed this 21st day of April 1970.

(SEAL)

Attest:

Edward M. Fletcher, Jr.                         WILLIAM E. SCHUYLER, JR.

Attesting Officer                                   Commissioner of Patents